US009178433B2

(12) United States Patent
Jutras et al.

(10) Patent No.: US 9,178,433 B2
(45) Date of Patent: Nov. 3, 2015

(54) DROOP CURRENT SHARING POWER CONVERTER WITH CONTROLLED TRANSITIONS BETWEEN REGULATION SET POINTS

(71) Applicant: Bel Fuse (Macao Commercial Offshore) Limited, Andar H-K (MO)

(72) Inventors: Mark Jutras, Upton, MA (US); Mark Masera, North Grafton, MA (US)

(73) Assignee: Bel Fuse (Macao Commercial Offshore) Limited, Andar H-K (MO)

( * ) Notice: Subject to any disclaimer, the term of this patent is extended or adjusted under 35 U.S.C. 154(b) by 134 days.

(21) Appl. No.: 14/029,222

(22) Filed: Sep. 17, 2013

(65) Prior Publication Data

US 2014/0340941 A1    Nov. 20, 2014

Related U.S. Application Data

(60) Provisional application No. 61/823,529, filed on May 15, 2013.

(51) Int. Cl.
*H02M 3/335* (2006.01)
*G06F 1/26* (2006.01)
(Continued)

(52) U.S. Cl.
CPC ............ *H02M 3/33523* (2013.01); *G06F 1/26* (2013.10); *H02J 1/102* (2013.01); *H02M 3/285* (2013.01); *H02M 3/33515* (2013.01); *H02M 2001/0025* (2013.01)

(58) Field of Classification Search
CPC ............ H02M 2001/0025; H02M 2001/0032; H02M 2001/0048; H02M 3/335; H02M 3/33515
USPC ..................... 323/268, 272; 363/21.12–21.18
See application file for complete search history.

(56) References Cited

U.S. PATENT DOCUMENTS 3,922,594 A * 11/1975 Brown .......................... 363/101
6,009,000 A * 12/1999 Siri ............................. 363/21.09
(Continued)

FOREIGN PATENT DOCUMENTS

CN       201328102 Y    10/2009
CN       101686012 A    3/2010
(Continued)

OTHER PUBLICATIONS

Brian T. Irving and Milan M. Jovanovic, "Analysis, Design, and Performance Evaluation of Droop Current-Sharing Method"; Published in Applied Power Electronics Conference and Exposition, 2000, APEC 2000, Fifteenth Annual IEEE (vol. 1), pp. 235-241, vol. 1, New Orleans, LA.

(Continued)

*Primary Examiner* — Timothy J Dole
*Assistant Examiner* — Yusef Ahmed
(74) *Attorney, Agent, or Firm* — BainwoodHuang

(57) ABSTRACT

A regulated switching power converter generates a converter output having first and second regulated output values under corresponding operating conditions. The converter output transitions between the first and second output values in response to transition of a trigger signal in a transition window between first and second trigger values. A transition step function is based on transition amplitude, transition interval and number of steps, the transition amplitude being a difference between the first and second regulated output values, and the transition interval being a difference between the first and second trigger values. The transition step function generates a step-like transition signal based on values of the trigger signal between the first and second trigger values. During operation in the transition window, the step-like transition signal is included in the regulation reference value to generate a step-like transition of the converter output between the first and second regulated output values.

6 Claims, 4 Drawing Sheets

(51) Int. Cl.
*H02M 3/28* (2006.01)
*H02J 1/10* (2006.01)
*H02M 1/00* (2007.01)

(56) References Cited

U.S. PATENT DOCUMENTS

| | | | |
|---|---|---|---|
| 6,069,807 A * | 5/2000 | Boylan et al. | 363/97 |
| 6,911,808 B1 * | 6/2005 | Shimamori | 323/283 |
| 8,237,423 B2 * | 8/2012 | Heineman et al. | 323/283 |
| 2004/0075600 A1 * | 4/2004 | Vera et al. | 341/166 |
| 2004/0189251 A1 * | 9/2004 | Kutkut et al. | 320/128 |
| 2007/0009066 A1 * | 1/2007 | Fredriksson | 375/326 |
| 2007/0076455 A1 * | 4/2007 | Burstein | 363/72 |
| 2008/0310200 A1 * | 12/2008 | Maksimovic et al. | 363/65 |
| 2009/0212758 A1 * | 8/2009 | Asinovski et al. | 323/355 |
| 2013/0294111 A1 * | 11/2013 | Persson et al. | 363/16 |
| 2014/0312858 A1 * | 10/2014 | Sreenivas et al. | 323/234 |

FOREIGN PATENT DOCUMENTS

| | | |
|---|---|---|
| JP | H03253260 A | 11/1991 |
| JP | H09103032 A | 4/1997 |
| WO | 2005091111 A1 | 9/2005 |
| WO | 2009107680 A1 | 9/2009 |
| WO | 2010149205 A1 | 12/2010 |

OTHER PUBLICATIONS

Jung-Won Kim, Member, IEEE, Hang-Seok Choi, Student Member, IEEE, and Bo Hyung Cho, Senior Member, IEEE, "A Novel Droop Method for Converter Parallel Operation", 8 pages, IEEE Transactions on Power Electronics, vol. 17, No. 1, Jan. 2002.

Robert Kollman, Power Tip 27: "Paralleling Power Supplies Using the Droop Method"; EE Times, Connecting the Global Electronics Community; 4 pages, http://www.eetimes.com/document.asp?_id=1278268, Sep. 2010.

Bob Mammano and Mark Jordan, "Load Sharing with Paralleled Power Supplies", Sep. 1991, 16 pages, Copyright 2001, Texas Instruments, Inc., Dallas, Texas.

Patrick Le Fevre, "Reducing Energy Consumption in ICT by Implementing Dynamic Bus Voltage Architecture", Electronics Goes Green 2012+ (EGG), Sep. 9, 2012, IEEE, pp. 1-6.

* cited by examiner

DROOP CURRENT SHARING POWER CONVERTER WITH CONTROLLED TRANSITIONS BETWEEN REGULATION SET POINTS

BACKGROUND

In large electronic systems it is common practice to use a distribution voltage of around 50 VDC to bring power to individual system cards. Each individual system card converts this 50 VDC to a lower regulated intermediate voltage around 10 VDC by means of an isolated DC/DC converter. The 10 VDC bus is used as an input by one or more point of load converters that provide power to the circuits on the individual system cards. On systems cards that require high power it is common practice to arrange multiple isolated DC/DC converters in parallel to meet the power requirements of the card. It is desirable that the paralleled DC/DC converters share current in a balanced manner. Different schemes for current sharing may be employed, including a scheme known as "droop current sharing" in which each converter in a paralleled arrangement has a negative-slope "droop" output characteristic. It may be desired to switch the output of paralleled DC/DC converters to different regulation points (respective output voltage values) in order to maximize system performance. Since each of the paralleled converters is an independent device, the trigger condition to switch regulation values will be detected by and reacted to within each converter.

SUMMARY

If it is desired to move the regulation point relative to the same trigger variable it is unlikely that each paralleled converter will respond at the exact same point. This is due to component tolerances as well as slight differences in the operating conditions. All converters will react in the vicinity of the desired transition point but not precisely at the same point. So it is possible that at values around the trigger point some of the parallel converters may not have transitioned to the new regulation set point. This will set up an offset in the individual output voltages that the parallel converters will try to regulate to, and could result in large current imbalances around the trigger point.

Disclosed is a technique for controlling the transition between regulation values around a trigger point to limit the current imbalance when droop current sharing is implemented.

In particular, a method is disclosed of operating a regulated switching power converter that generates a converter output having distinct first and second regulated output values under corresponding distinct operating conditions. Operation employs a regulation reference value for a regulation feedback loop, and the converter output transitions between the first and second regulated output values in response to corresponding transition of a trigger signal in a transition window between first and second trigger values. In one embodiment the trigger signal is a signal proportional to the input voltage of the converter, and the method is used as part of adjusting the ratio Vout/Vin for efficient operation.

A transition step function is defined based on respective values for transition amplitude, transition interval and number of steps, where the transition amplitude is a difference between the first and second regulated output values, and the transition interval is a difference between the first and second trigger values. The transition step function generates a step-like transition signal based on ranges of values of the trigger signal between the first and second trigger values. During operation with the trigger signal having a value in the transition window, the step-like transition signal is included in the regulation reference value to generate a step-like transition of the converter output between the first and second regulated output values.

When used by all power converters in a paralleled arrangement, the disclosed technique reduces current imbalance by reducing the effect of even small mismatches in droop output characteristics. With proper design, offsets can be reduced to the magnitude of one step rather than the magnitude of the entire difference between the first and second regulated values. The technique can also be used for other purposes, both in paralleled and non-paralleled arrangements.

BRIEF DESCRIPTION OF THE DRAWINGS

The foregoing and other objects, features and advantages will be apparent from the following description of particular embodiments of the invention, as illustrated in the accompanying drawings in which like reference characters refer to the same parts throughout the different views.

DETAILED DESCRIPTION

Figure 1:
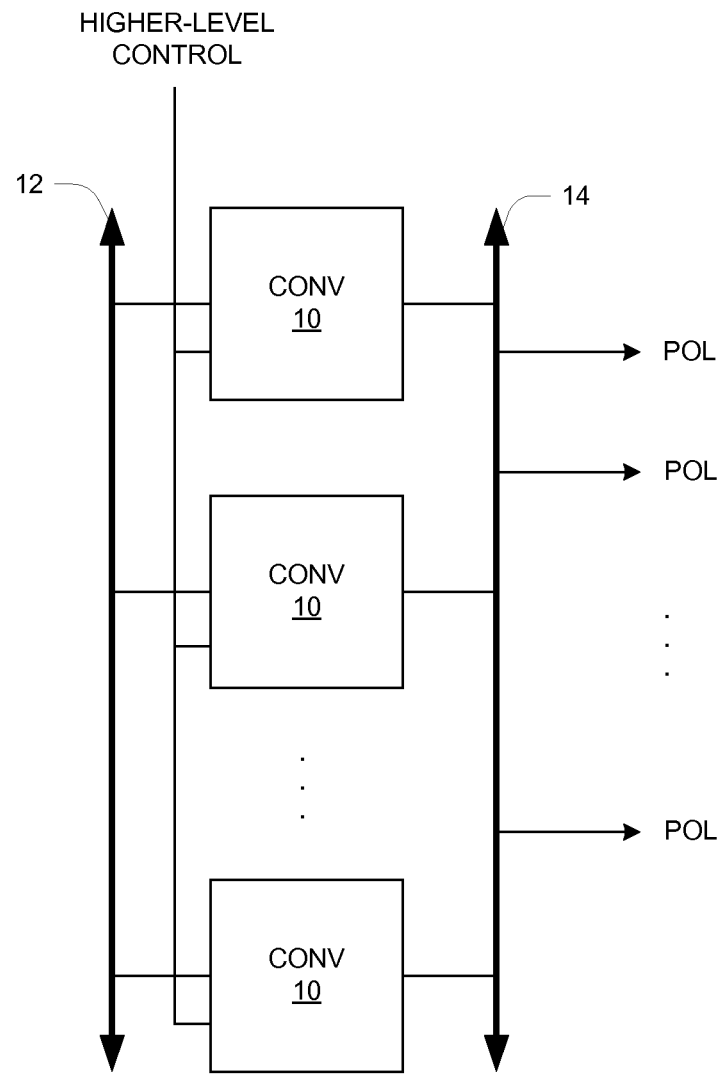
FIG. 1 is a block diagram of a power supply system employing multiple parallel-connected DC/DC converters.

FIG. 1 shows a power supply system having a set of DC/DC converters 10 arranged in parallel between an input power bus 12 and an output power bus 14. In a typical case, the voltage at the input power bus 12 ("input voltage") is higher than that of the output power bus 14 ("output voltage"). Power from output bus 14 is supplied to a set of point-of-load regulators (POLs; not shown) that provide power to local loads. In this kind of application the output power bus 14 may be referred to as an "intermediate" bus, because its voltage is typically in between a relatively high input voltage and lower voltages generated by the POLs. Converters for such uses are commonly referred to as "intermediate bus converters" or IBCs. The converters 10 may be under the control of a higher level system power controller (HIGHER LEVEL CONTROL, not shown in FIG. 1).

It is desirable to use parallel-connected sets of DC/DC converters 10 in a variety of applications, generally when the power required by an electric/electronic system is more than one DC/DC converter 10 can supply. In this configuration, the output voltages of the converters 10 are all inherently the same and equal to the output voltage appearing on the output bus 14. Load current is provided in a shared manner by the converters 10. As a simple example employing equal current sharing, if there are five identical converters 10 and the load current is 50 amperes (amps), then ideally each converter 10 provides 10 amps.

It is necessary to provide current-sharing control in systems using parallel DC/DC converters to ensure that load current and heat dissipation are evenly distributed and to prevent one or more of the converters from becoming overloaded. There are many current sharing methods including master-slave current-programming with dedicated master, average current-programming with automatic master control, and maximum current-programming with automatic master control and external control. In one embodiment, a current sharing scheme supported by the presently disclosed converter 10 is the so-called "droop" method, so named because of the use of a downward-sloping output characteristic of the converter output as explained below.

Figure 2:
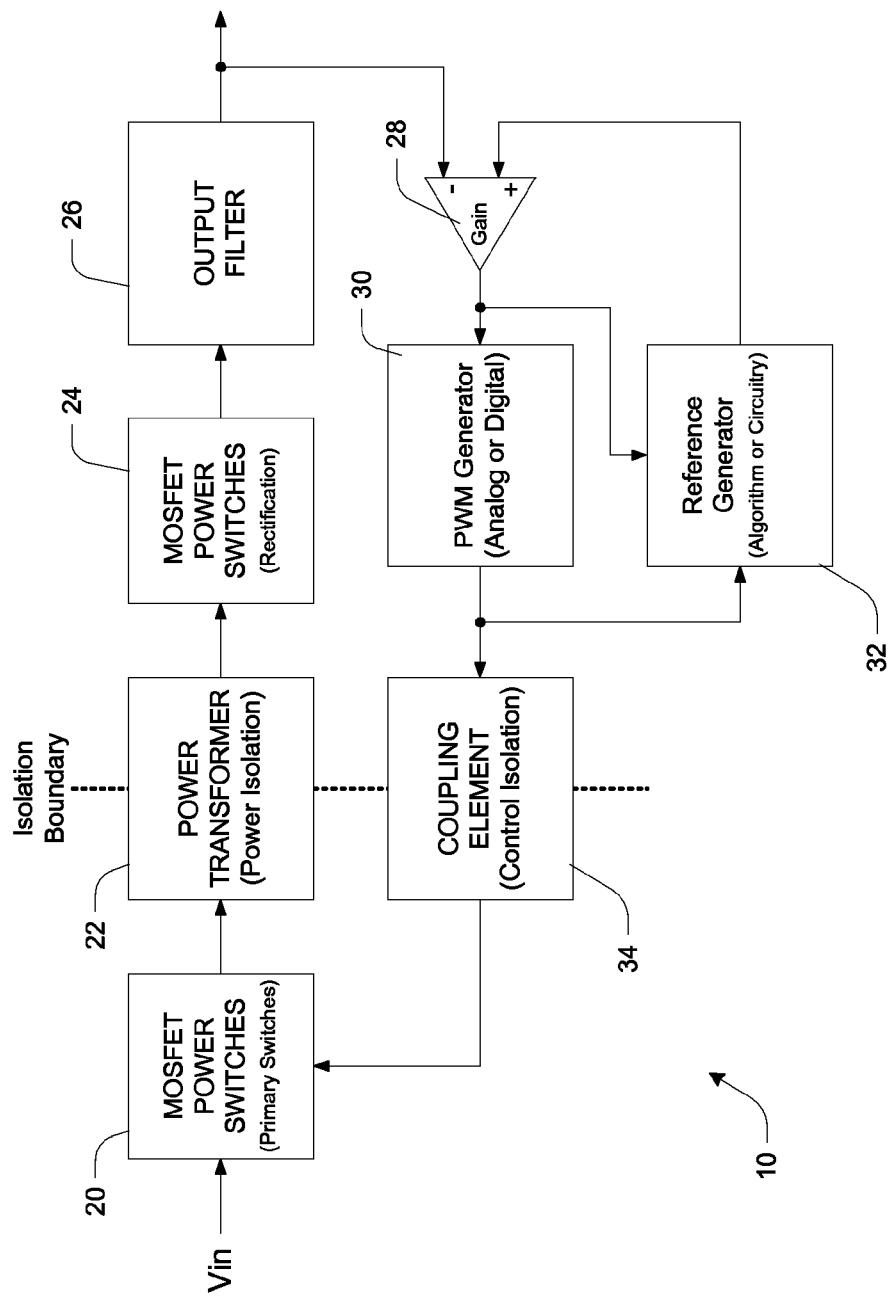
FIG. 2 is a block diagram of a DC/DC converter.

FIG. 2 is a block diagram of a digital DC/DC converter 10. As shown, it includes primary-side MOSFET power switches 20, an isolating power transformer 22, secondary-side MOSFET power switches 24, and an output filter 26. Operation is regulated by a feedback-path circuit including an error amplifier 28, PWM generator 30, reference generator 32, and isolating coupling element 34.

It is noted that the PWM generator 30 is located on the secondary side of the isolation boundary. This arrangement is referred to as "secondary-side control". Some conventional digital regulated converters employ primary-side control in which the control circuitry is connected to a primary-side ground. In this case, any control signals for secondary-side components must pass through isolating elements such as opto-couplers in order to maintain isolation between the primary and secondary sides. Opto-couplers tend to suffer from low reliability and poor dynamic response. Thus, the illustrated arrangement employing secondary-side control can exhibit improved reliability and dynamic response over such conventional converters using primary-side control. Also, operating parameters (i.e., proportional-integral-derivative or PID parameters) can be updated according to operating state for best output characteristic by the digital regulated converter with secondary-side control. Also, nonlinear control can be adopted for good dynamic response.

As indicated above, the converter 10 may be under the control of a higher level system controller, in which case the converter 10 will also include a communications interface to such separate controller. Examples of such a communications interface include I2C, SPI and UART.

As mentioned, in one embodiment current sharing is achieved using the droop current-sharing method. This method for current sharing is realized by establishing a slightly negative output impedance (ratio of output voltage to output current) for each converter in a paralleled arrangement. This is in contrast to the typical ideal output impedance of zero (converter maintains constant voltage over a range of current). In operation, the output voltage serves as a signaling mechanism for each converter to adjust its output current to effect a desired sharing. Droop current sharing essentially forces parallel connected power supplies or converters to share load current among themselves in a desirably balanced manner. It works by allowing the output voltages of each paralleled supply to sag ("droop") with increasing load current.

Figure 3:
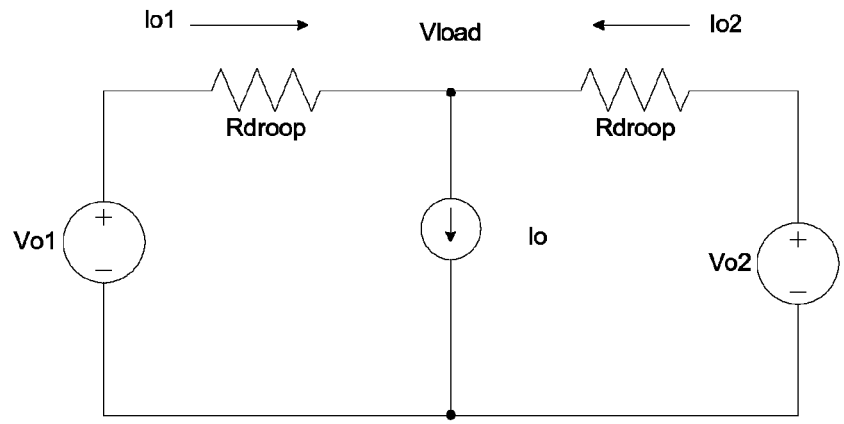
FIG. 3 is a schematic representation of droop current sharing.

FIG. 3 shows a simplified circuit model as a reference for description below of operation of droop current sharing. Each converter is modeled as a respective voltage source Vox (x=1, 2 in this simple two-converter example) in series with a droop resistance Rdroop, resulting in a respective current Iox. The voltage and current at the load are Vload and Io.

Figure 4:
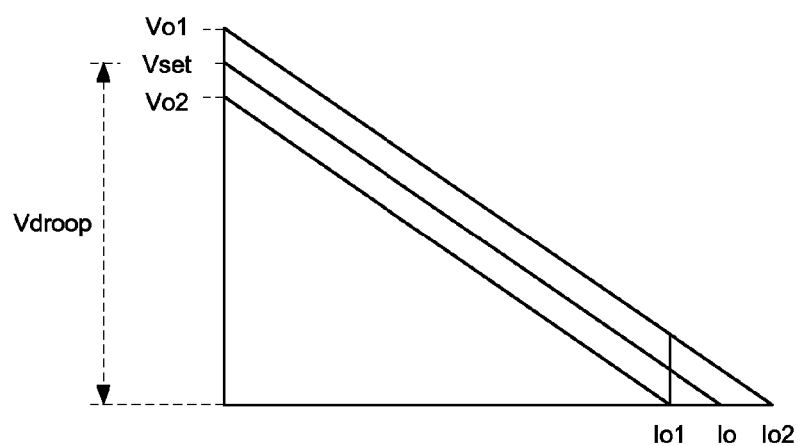
FIG. 4 is a graph of current/voltage characteristics in droop current sharing.

FIG. 4 is a plot of output voltage Vo versus load Io characteristics for the two different converters in the model of FIG. 3, identified with indices 1 and 2. Also shown is a set point voltage Vset discussed below. The line 40 illustrates that the different characteristics of the converters causes them to share load current Io ($=I_{O1}+I_{O2}$) unequally.

For analysis, a value referred to as "set point accuracy" of each source is defined to be +/−Kv. Also, the effective droop resistance between each source and the load is defined as Rdroop, and an allowable difference in load contribution of the two sources is +/−Ki. Based on the model of FIG. 3 and assuming worst-case differences between the sources, the following equality holds:

$$\frac{V_{o1} - V_{load}}{I_{o1}} = \frac{V_{o2} - V_{load}}{I_{o2}}$$

Where:

$$V_{o1} = V_{set} \cdot (1 + K_V)$$

$$V_{o2} = V_{set} \cdot (1 - K_V)$$

$$I_{o1} = \frac{(1 + K_i) \cdot I_o}{2}$$

$$I_{o2} = \frac{(1 - K_i) \cdot I_o}{2}$$

and Vset is the setpoint voltage and Vload is the load voltage.

Solving the above equations for Vdroop=Vset−Vload results in the amount of droop voltage Vdroop (see FIG. 4) required as a function of output voltage set point Vset, output voltage set point accuracy Kv, and required maximum current imbalance between the modules sharing the load current, Ki.

$$V_{droop} = \frac{K_v}{K_i} \cdot V_{set}$$

Ki is typically a system specified requirement. The output voltage Vload typically has an upper and a lower specified limit. From those limits, a set point can be selected knowing a tolerance that will exist given the accuracy of the circuit components being used, and thus the set point accuracy Kv. With that information, a droop voltage Vdroop can be determined to satisfy a Ki requirement.

From the above it can be seen that if the droop impedances Rdroop are very close to equal, the accuracy of current sharing is dominated by the values of the voltage sources Vo1, Vo2. Accurate matching of droop impedances can be achieved cost effectively using calibration if digital control is employed. Also, if the voltage sources are generated by individual DC/DC converters then calibration can also be used to achieve accurate set points for the converters and achieve equal sharing of load current by the converters. It will be noted that this analysis extends to any desired non-equal sharing of current, which can arise in some applications. A purposeful non-equal sharing can be obtained by suitable manipulation of Vdroop for each converter in a given application.

In some applications, power converters are capable of operating at different regulated output voltages, and this capability is used to adjust output voltage under various operating conditions for improved performance. In one common case especially applicable to IBC converters, output voltage may be varied as a function of input voltage to maintain a desired level of operating efficiency. As input voltage increases, for example, duty cycle must be decreased to maintain a given output voltage. If the target output voltage is increased, then duty cycle can be kept in a more efficient range. In the IBC application, the converters are generating an intermediate voltage used by the POL converters, which can operate over a range of input voltage. The intermediate voltage generated by the IBC converters is not constrained to be fixed, and this freedom can be exploited to improve overall efficiency. There are also other use cases for a variable-voltage-output converter.

Adjustable-output converters may use a set of discrete output voltages rather than a continuous range. Such discrete output voltages are referred to as "regulation points" or "set points" herein. Typically a converter's output switches from one regulation point to another based on some event, which is referred to herein as a "trigger" or "trigger condition". In the case of adjusting output voltage as a function of input voltage as discussed above, triggers may occur as the input voltage crosses certain predetermined thresholds. Examples of such operation are described below.

When converters are operated in parallel and a trigger condition is used to move to a new calibrated regulation point, it is possible that at some value(s) around the trigger point one or more of the converters may have changed to a new regulation point while others of the paralleled converters have not yet changed their outputs. If this occurs, a large imbalance among the sourced currents may occur. In some cases, the imbalance may be such that some converters are forced to current levels that trigger protection circuits or processes, potentially causing an entire system to shut down.

With the use of full digital or partial digital control, it is possible to use specific algorithms to control transition characteristics around trigger points. In the case of setting a regulation set point, in one embodiment that is done by setting the value of a regulation reference. With reference to FIG. 2, the regulation reference value is generated by reference generator 32 and provided to error amplifier 28. The droop characteristic of the converter is achieved by subtracting from the regulation reference a value that is proportional to the output current. In the disclosed technique, a transition window is used around trigger points to enable output voltage to move between regulation points in a way that will not leave some converters at set points far different than others. Within the transition window, the output voltage is changed in multiple discrete and relatively small regulation steps. It is possible to size each step so that inside the transition window there is at most a single step differential between the set points of the different converters at a given instant, thus greatly improving how current balance is maintained during the larger overall transition between discrete output voltages.

In an illustrative example below, the system has two distinct regulation points at 9.5 V and 10.2 V. It will be appreciated that the 0.7 volt difference between these values could give rise to significant current imbalance in the neighborhood of a transition if different converters are trying to regulate to different ones of these regulation points. In this example, a transition window extends from 9.5 V to 10.2 V for Vout, and six steps of about 0.1 V per step are used.

One example of a trigger variable may be a voltage source, such as the input voltage, that could assume a value between a minimum and a maximum. A trigger point would be set as a value somewhere between the minimum and maximum and the trigger window would be set up by defining incremental points above and below the trigger point. The distance between these incremental points defines the width of the trigger window. Since the trigger variable might during operation assume a point anywhere between the minimum and maximum values it is possible that it could settle at a point around the trigger point but still within the defined width of the trigger window. If during operation the trigger variable moves between two points within its defined range and if the final point falls within the trigger window a fixed regulation point will be assumed as one of the regulation steps defined by the trigger window characteristics.

Thus the disclosed technique sets the regulation reference for a regulated DC/DC converter, either isolated or non-isolated, to multiple regulation values based on a trigger variable. A trigger variable, such as input voltage, is monitored to determine when the DC/DC converter switches to a different regulation point. Each of the regulation values will be fixed for a substantial span of the trigger variable. A trigger window is set up around each trigger point. While the trigger variable is within the trigger window the regulation reference moves the set point between the starting and final regulation values in multiple discrete regulation steps.

In setting up such an algorithm the desired regulation points are first defined. An example is used to illustrate. In this example two reference values corresponding to two regulation points are defined as a low reference ($Ref_{low}$) and a high reference ($Ref_{high}$). A trigger variable is also defined, which in this example will be the input voltage Vin to the DC/DC converter, along with a trigger point which in this example is a predetermined input voltage value Vin=Vswitch. When transitioning between the two regulation points, the regulation reference is moved in discrete steps. A width of the transition window ($Transition_{width}$) is defined, along with a defined number of steps ($Transition_{steps}$). For this illustrative example, the following specific values are used:

$Ref_{low}$:=9.5
$Ref_{high}$:=10.2
$V_{switch}$:=41
$Transition_{width}$:=1
$Transition_{steps}$:=6

From the above values the height (voltage magnitude) of each discrete regulation step ($Step_{size}$) can be calculated, as well as the voltage increments of the trigger variable ($Step_{index}$) that induce movement between adjacent steps. These parameters are used to define the behavior of the reference in the transition window as a function of the trigger variable. This is defined below as the function Vtransition (Vin).

$$Step_{size} := \frac{Ref_{high} - Ref_{low}}{Transition_{steps}}$$

$$Step_{index} := \frac{Transition_{width}}{Transition_{steps}}$$

$$V_{transition}(V_{in}) := Ref_{low} + Step_{size} \cdot \left(\text{floor}\left(\frac{V_{in} - V_{switch} + \frac{Transition_{width}}{2}}{Step_{index}}\right)\right)$$

In the above, the "floor" function returns the largest integer value less than the value of the argument.

Vtransition is used in generating the final regulation reference value as explained below.

Most DC/DC converters have an input under voltage lock out (UVLO) and input over voltage lock out (OVLO) that shut off the converter above and below corresponding voltage values. In order to define the operation of the DC/DC converter over a full span of input voltage, a binary-valued function $Lockout_{switch}(Vin)$ is defined below:

$V_{UVLO} := 37.5$     $V_{OVLO} := 55$
$Lockout_{switch}(V_{in}) := \text{if}(V_{in} < V_{UVLO} \, 0, \text{if}(V_{in} > V_{OVLO} \, 0, 1))$ The above expression for Lockout$_{switch}$ employs a format used in certain mathematical modeling software known as MathCAD®. In this case, Lockout$_{switch}$ is equal to 0 if Vin is less than $V_{UVLO}$ or greater than $V_{OVLO}$, and otherwise it is equal to 1.

When a DC/DC converter employs droop regulation, its output voltage decreases in proportion to increases in load current. Droop is achieved by subtracting a variable voltage value that changes in proportion to the current delivered by the converter. The slope of the droop function is defined, and this value multiplied by the load current is subtracted from the reference. Droop is often called "load line" (LL), and droop slope can be referred to as $k_{ll}$.

Using the parameters explained above a calculation can be set up for a reference value that achieves multiple regulation set points along with a transition window to move between the set points as a function of a trigger variable. The load line is also entered into the reference calculation. The regulation reference equation is defined using a set of conditional statements that assigns a value to it depending on the value of the trigger variable in relation to the trigger window. In this example the trigger variable is $V_{in}$. The trigger point is defined as $V_{switch}$. The trigger point is centered between two values defined by Transition$_{width}$ and the area between these two values defines the transition window. $k_{LL}$ is the slope of the load line that defines the droop characteristic and $I_{load}$ represents the output current. Using the pseudo code below the method of realizing a value for the regulation reference is defined.

```
Regulation_ref(V_in, I_load) =
    If (V_in < V_switch - Transition_width/2)  {
        Regulation_ref = Ref_low - k_LL*I_load
    Else if (V_in > V_switch - Transition_width/2)
        Regulation_ref = Ref_high - k_LL*I_load;
    Else
        Regulation_ref = V_transition(V_in) - k_LL*I_load;
}
```

From the pseudo code above when the trigger variable is outside of the established trigger window the regulation reference is assigned one of two possible constant values from which an incremental value proportional to the output current is subtracted. When the trigger variable is inside the trigger window the regulation reference is equated to the previously defined function $V_{transition}(V_{in})$ from which an incremental value proportional to the output current is subtracted.

In this example the input voltage is used as the trigger variable to switch between regulation points. Adding in the input voltage lockout feature, the output voltage as a function of input voltage and load is defined by the equation below.

$$V_{out}(V_{in}, I_{load}) := \text{Regulation}_{ref}(V_{in}, I_{load}) \cdot \text{Lockout}_{switch}(V_{in})$$

Figure 5:
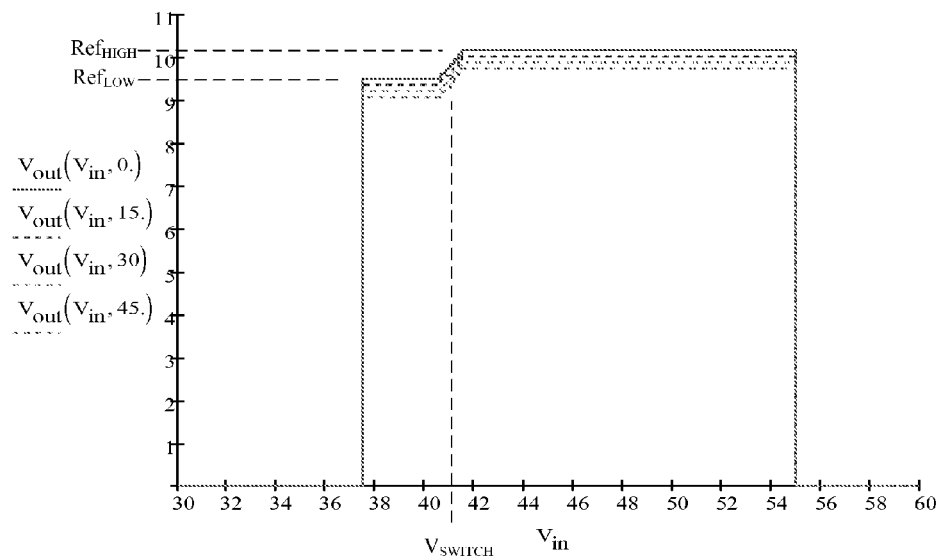
FIG. 5 is a graph of voltage output versus voltage input for a set of converters with a transition between regulated voltage output values.

FIG. 5 shows the behavior of the output voltage of a DC/DC converter that employs a reference generating feature as a function of the trigger variable (Vin) and load current (Iload) such as described above.

In the graph of FIG. 5 there are two primary discrete regulation points at 9.5 and 10.2 volts, and the transition between these voltages within the transition window is made up of multiple small discrete regulation steps. FIG. 5 shows plots for four different loads Iout=0 A, 15 A, 30 A and 45 A, and it can be seen that for a given input voltage, as load increases the regulation point for the output voltage falls slightly in proportion to the load current. This latter behavior is the load line or droop characteristic used to facilitate droop current sharing in the case of paralleled converters.

Figure 6:
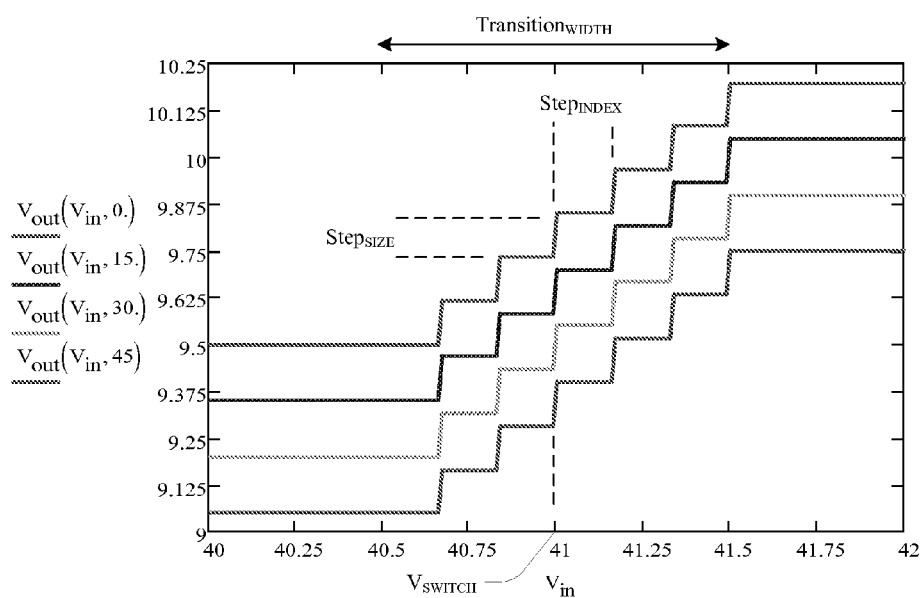
FIG. 6 is a graph of a section of the graph of FIG. 5 showing a transition window in detail.

FIG. 6 illustrates behavior in the transition window in closer detail. The step transitions are at approximately the following input voltages: 40.67, 40.83, 41, 41.17, 41.33 and 41.50 volts, and the output voltage transitions approximately 0.7 volts in total over this range.

In a system in which a DC/DC converter is controlled with a digital controller such as a DSP (digital signal processor) or microcontroller, a reference control algorithm such as described above and the calculations required to realize it may be implemented by operation of firmware programmed into such a controller. Control functionality could also be implemented in a programmable state-machine logic rather than an instruction-based processor. It is possible that a digital controller that implements this algorithm takes the role as the primary controlling device for regulation using closed loop techniques such as PID loops. A digital controller can also be used to set up the reference value through a digital to analog converter (DAC) or a PWM output to be delivered to a traditional analog control scheme. Regardless of implementation, as long as the digital device realizing the algorithm has the ability to gather voltage and current information this algorithm can be implemented by means of programming functions. That information may be gathered by means of analog to digital (ADC) inputs with the use of additional analog signal conditioning such as resistor dividers, amplifiers, sense resistors, and/or current sense transducers, etc.

The examples above use triggers to initiate the transition between set points that are levels of a signal proportional to Vin. In an embodiment using secondary-side control as described herein, this signal may be generated in various ways. In one example, this signal is generated by measuring the voltage across the secondary of the power transformer 22. However, in some cases it may be impractical to obtain such a signal or to obtain a signal having sufficient accuracy. For example, the secondary voltage of the transformer 22 represents Vin, but that signal is not always perfect in that representation. In such a case, some other a condition can be defined to step between the regulation points, based on values that are present in the control circuitry if analog control is used or that are calculated by the control algorithm in the case of digital control.

At the power levels typical of the end application the power conversion topology may be a square wave or quasi resonant topology including but not limited to a Full Bridge, Half Bridge, Push-Pull, or any of the Forward Converter derivatives. For each of these topologies, from a large signal standpoint, Vout is proportional to Vin*D*N, where N is the turns ratio of the power transformer (e.g. 22) and D is the duty cycle of the PWM signal generated by the controller (e.g., 30) and delivered through additional circuitry to the gates of the MOSFET switching devices (e.g., 20). The value of D is set by a "control voltage" which in the case of FIG. 2 is the output of amplifier 28. This gain stage sets the control voltage to the value required to maintain the output at a constant value set by the regulation reference. It is possible to use the value of either the control voltage or the duty cycle as a trigger to transition to a different regulation reference value using a transition window to move between the set points in regulated steps. This technique is possible with an analog control technique where the control voltage or PWM signal could be monitored by additional circuitry used to generate the reference. This technique is also applicable with a digital PID control technique where the duty cycle and control constants are calculated by control program and these variables available during the execution of the program instructions and can be used to trigger the reference change.

One of the purposes of regulating output voltage to a reference value is to improve the accuracy of droop current sharing. If the error voltage or duty cycle is used as a trigger point then the regulation reference value can be set so that the converter never loses regulation within the input voltage lockout bounds. Thus very accurate droop current sharing can be achieved over a wide Vin range. Generally in any real system there will be a duty cycle limit that, once reached, signifies that output voltage control cannot be robustly maintained. Such a condition can be responded to by stepping to a lower set point (reference value) when the control loop moves the duty cycle to values near that limit. At a lower set point there will be additional duty cycle "head room" to maintain regulation at the lower output voltage.

In the above example of using a transition window centered around a trigger point, the set point reference is moved in discrete steps as the trigger signal passes through the window. It is also possible to set up a time window initiated by a trigger parameter. This may be desired in the case of response delays with paralleled converters. When using the duty cycle as a trigger to move the output set point in response to a lower input voltage, it may be desirable to use a time window so that the transition is stepped in time. If two or more converters are in parallel, once the first converter detects the duty cycle trip point in response to lower input voltage it can be configured to respond by lowering its set point stepped in time. However, the first reaction may be to briefly generate an incremental increase in duty cycle and then execute a time stepped decrease in set point to the new final value. The initial incremental duty cycle increase will slightly increase the current sourced from that converter, and the other parallel converters will respond by trying to increase their voltage per their load line dynamics. Since all of the parallel converters will be in the vicinity of the trigger event, this action will force all converters to the duty cycle trigger point and react in the same fashion as the first converter. Since it will take a finite time period for these responses to materialize in this scenario, a time window will allow the units to move to the new regulation point with only a slight transient skew in set point values.

The technique described above defines a process for detecting a duty cycle that increases in response to a lowering of the input voltage and reacts by first moving the set point to a higher value and then lowering the set point to a lesser value so that regulation is established at a new decreased set point. This process can also be defined in the other direction by detecting a duty cycle that decreases in response to a raised input voltage and reacting by first moving the set point to a lower value and then increasing the set point to a higher value to maintain regulation at a new increased set point. Moving to a higher regulated set point could be done as a means to minimize power losses by taking advantage of a larger portion of the available duty cycle.

Regardless of the trigger signal the transition window can be based on values of the trigger signal or can be time based depending on the dynamics of the system.

As described, the technique may be used in a system employing paralleled converters to optimize performance of droop current sharing by providing a substantially always regulated output that may switch between different regulation points for the purpose of optimizing performance. The technique can also be useful in non-parallel operation, for example to provide soft start between optimization points with predictable regulated steps.

The disclosed technique differs from known prior art techniques used to define the output voltage characteristics of the isolated DC/DC converters used as front end power conversion blocks that drive a downstream regulating device (POL converter) that generates a final voltage used by the circuits. Those other techniques included unregulated, semi-regulated and quasi-regulated. These techniques do not provide precise control of the voltage delivered to the intermediate bus over the entire input voltage operating range. Since the voltages are not precisely controlled, the ability to optimize current sharing over the operating range is not possible. The disclosed multi-set-point technique implemented in conjunction with droop current sharing allows for the optimization of many parameters in addition to current sharing. By always controlling the output voltage to a substantially regulated value, the addition of digital controls and associated calibration techniques allow for tight control over the droop current sharing. None of the other techniques address this particular issue. Since the integrity of the droop sharing can be maintained while transitioning to different regulation points, it is also possible to co-implement output set points that allow for efficiency optimization based on trigger points such as input voltage.

In the above description the concept of a trigger variable is used as the means to trigger a stepped transition between regulation points. While using a digital device that is programmed it is also possible to construct a trigger algorithm to signal the set point transition. Such an algorithm might take into consideration a more complex set of variables in determining when to move between regulation values. Another possibility is to employ a seeking algorithm in which one or more converters in a system would move to new set points in discrete regulating steps to find an optimum operating point based on other measured parameters. One example of such an application would be droop positioning, in which an algorithm is used to find a converter's best point on the load line. For example if a converter's output current is near its limit point, the converter could try to step down its voltage to find a relief point, and/or it could increase the slope of its load line. Another example of set point seeking is to improve current balance if the input voltages to paralleled converters are skewed (i.e., they do not all see exactly the same value of a system input voltage).

The transition window behavior can be set up so that based on tolerances none of the paralleled converters are more than a transition step apart in the setting of their regulation step while moving between set points. This means that if the steps are sized properly the skew in current balance can be limited to tolerable excursions during the transition. An analysis can be used to calculate error in current share assuming similar/equal droop impedance as the voltage sources diverge from true equality.

While various embodiments of the invention have been particularly shown and described, it will be understood by those skilled in the art that various changes in form and details may be made therein without departing from the spirit and scope of the invention as defined by the appended claims.

What is claimed is:

1. A method of operating a regulated switching power converter generating a converter output having distinct first and second regulated output values under corresponding distinct operating conditions, operation employing a regulation reference value for a regulation feedback loop, the converter output transitioning between the first and second regulated output values in response to corresponding transition of a trigger signal in a transition window between first and second trigger values, comprising:

defining a transition step function based on respective values for transition amplitude, transition interval and number of steps n, the transition amplitude being a difference between the first and second regulated output values, the transition interval being a difference between the first and second trigger values, the transition step function generating a step-like transition signal having n steps and being generated based on ranges of values of the trigger signal between the first and second trigger values; and during operation with the trigger signal having a value in the transition window, including the step-like transition signal in the regulation reference value to generate a step-like transition of the converter output between the first and second regulated output values, wherein the trigger signal is a signal proportional to an input voltage of the regulated switching power converter, wherein the signal proportional to the input voltage is a signal representing a duty cycle of operation of the regulated switching power converter, further including use of a time window initiated by the signal representing the duty cycle so that the transition of the converter output is stepped in time, and upon detecting a duty cycle trip point in response to change of input voltage, responding by a stepped transition of a set point of operation in time, and wherein the regulated switching power converter is configured and operated in parallel with other power converters, and wherein an initial reaction preceding the stepped transition is a transitory incremental change of the duty cycle in a direction opposite to that of the stepped transition, the transitory incremental change resulting in a change in a current sourced by the regulated switching power converter sufficient to be detected by the other power converters to cause all the power converters to transition respective converter outputs to a new regulation point with a minimal skew in set point values.

2. The method according to claim 1, wherein the duty cycle trip point is a maximum duty cycle encountered as the duty cycle increases in response to a decrease of the input voltage, and wherein the initial reaction moves a set point to a higher value before the set point is lowered to a lesser value to establish regulation at a new decreased set point.

3. The method according to claim 1, wherein the duty cycle trip point is a minimum duty cycle encountered as the duty cycle decreases in response to an increase of the input voltage, and wherein the initial reaction moves the set point to a lower value before the set point is raised to a higher value to establish regulation at a new increased set point.

4. The method according to claim 3, performed as part of a scheme of minimizing power losses by using a larger portion of available duty cycle.

5. A method of operating a regulated switching power converter generating a converter output having distinct first and second regulated output values under corresponding distinct operating conditions, operation employing a regulation reference value for a regulation feedback loop, the converter output transitioning between the first and second regulated output values in response to corresponding transition of a trigger signal in a transition window between first and second trigger values, comprising:

defining a transition step function based on respective values for transition amplitude, transition interval and number of steps n, the transition amplitude being a difference between the first and second regulated output values, and the transition interval being a difference between the first and second trigger values, the transition step function generating a step-like transition signal having n steps and being based on ranges of values of the trigger signal between the first and second trigger values; and during operation with the trigger signal having a value in the transition window, including the step-like transition signal in the regulation reference value to generate a step-like transition of the converter output between the first and second regulated output values, wherein the regulated switching power converter employs a programmable digital controller, and wherein the trigger signal is an output of a trigger algorithm executed by the programmable digital controller, wherein the trigger algorithm employs a seeking algorithm causing the regulated switching power converter to automatically move to new set points in discrete regulating steps to find an optimum operating point based on measured operating parameters, wherein the seeking algorithm includes a droop positioning algorithm to find a desired operating point on a load line of the regulated switching converter, and wherein the desired operating point is one of (a) a relief point of lower output current away from a point of a current limit, and (b) a point of desired current balance among a set of power converters including the regulated switching converter in which respective input voltages to different power converters are nominally equal but sufficiently offset from each other to cause current imbalance but for an effect of the droop positioning algorithm.

6. A method of operating a regulated switching power converter generating a converter output having distinct first and second regulated output values under corresponding distinct operating conditions, operation employing a regulation reference value for a regulation feedback loop, the converter output transitioning between the first and second regulated output values in response to corresponding transition of a trigger signal in a transition window between first and second trigger values, comprising:

defining a transition step function based on respective values for transition amplitude, transition interval and number of steps n, the transition amplitude being a difference between the first and second regulated output values, and the transition interval being a difference between the first and second trigger values, the transition step function generating a step-like transition signal having n steps and being based on ranges of values of the trigger signal between the first and second trigger values; and during operation with the trigger signal having a value in the transition window, including the step-like transition signal in the regulation reference value to generate a step-like transition of the converter output between the first and second regulated output values, wherein the regulated switching power converter employs a programmable digital controller, and wherein the trigger signal is an output of a trigger algorithm executed by the programmable digital controller, wherein the trigger algorithm employs a seeking algorithm causing the regulated switching power converter to automatically move to new set points in discrete regulating steps to find an optimum operating point based on measured operating parameters, wherein the seeking algorithm includes a droop positioning algorithm to find a desired operating point on a load line of the regulated switching converter, and wherein the desired operating point is one of (a) a relief point of lower output current away from a point of a current limit, and (b) a point of desired current balance among a set of power converters including the regulated switching converter in which respective output currents from different power converters are nominally balanced by a selected droop impedance but, due to different distribution impedances relative to a point of load, are sufficiently offset from each other to cause current imbalance but for an effect of the droop positioning algorithm.

\* \* \* \* \*